(12) United States Patent
Shao et al.

(10) Patent No.: US 12,716,760 B2
(45) Date of Patent: Aug. 25, 2026

(54) METHODS AND SYSTEMS FOR INTELLIGENT METERING OF NATRURAL GAS

(71) Applicant: CHENGDU QINCHUAN IOT TECHNOLOGY CO., LTD., Chengdu (CN)

(72) Inventors: Zehua Shao, Chengdu (CN); Haitang Xiang, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 927 days.

(21) Appl. No.: 18/064,284

(22) Filed: Dec. 11, 2022

(65) Prior Publication Data

US 2023/0108087 A1 Apr. 6, 2023

Related U.S. Application Data

(63) Continuation of application No. 17/649,340, filed on Jan. 28, 2022, now Pat. No. 11,592,323.

(30) Foreign Application Priority Data

Feb. 4, 2021 (CN) ......................... 202110154145.7
Jan. 14, 2022 (CN) ......................... 202210043934.8

(51) Int. Cl.
*G01F 9/00* (2006.01)
*G01D 4/00* (2006.01)

(52) U.S. Cl.
CPC ............... *G01F 9/00* (2013.01); *G01D 4/004* (2013.01)

(58) Field of Classification Search
CPC ...... G01F 9/00; G01F 15/0755; G01F 15/063; G01D 4/004; G01D 2204/16; G06Q 10/06; G06Q 10/06375; G06Q 50/06
(Continued)

(56) References Cited

U.S. PATENT DOCUMENTS 9,134,353 B2 * 9/2015 Jia .......................... G05B 15/02
2002/0091653 A1 * 7/2002 Peevey .................. G06Q 50/06 705/412
(Continued)

FOREIGN PATENT DOCUMENTS

AU 2015203118 A1 7/2015
CN 202178782 U 3/2012
(Continued)

OTHER PUBLICATIONS

Li Luguang et al., Study on the Implementation of Energy-Based Pricing for Natrual Gas in China, Dec. 2011, Gas Industry (Year: 2011).*

(Continued)

*Primary Examiner* — Marrit Eyassu
(74) *Attorney, Agent, or Firm* — METIS IP LLC

(57) ABSTRACT

The present disclosure provides a method for intelligent metering of natural gas, including obtaining a metering value of the natural gas used by a user in a time period from a metering device via a network, the metering device being located at a gas supply terminal of a transmission pipe network, and determining a consumption amount of natural gas based on the metering value and a pricing scheme. The pricing scheme includes a volume-based pricing scheme and an energy-based pricing scheme. Volume unit prices of the natural gas in different component types are different, and are determined based on an adjustment model.

13 Claims, 7 Drawing Sheets

100

(58) Field of Classification Search
USPC .......................................................... 73/198
See application file for complete search history.

(56) References Cited

U.S. PATENT DOCUMENTS

| | | | | |
|---|---|---|---|---|
| 2003/0158826 | A1* | 8/2003 | Burke .................... | G06Q 50/06 705/412 |
| 2009/0028209 | A1 | 1/2009 | Feitisch et al. | |
| 2013/0231909 | A1 | 9/2013 | Noureldin et al. | |
| 2014/0351187 | A1 | 11/2014 | Halim et al. | |
| 2018/0090934 | A1 | 3/2018 | Main et al. | |
| 2019/0128720 | A1 | 5/2019 | Farrell | |
| 2020/0184395 | A1 | 6/2020 | Fabris et al. | |
| 2023/0394453 | A1 | 12/2023 | Ding et al. | |

FOREIGN PATENT DOCUMENTS

| | | | | |
|---|---|---|---|---|
| CN | 103134619 | A * | 6/2013 | |
| CN | 103234120 | | 8/2013 | |
| CN | 103337109 | A | 10/2013 | |
| CN | 103542904 | A | 1/2014 | |
| CN | 103984316 | A | 8/2014 | |
| CN | 104197984 | A | 12/2014 | |
| CN | 204827709 | U | 12/2015 | |
| CN | 105869067 | A | 8/2016 | |
| CN | 107274081 | A | 10/2017 | |
| CN | 107707386 | A | 2/2018 | |
| CN | 107786635 | A | 3/2018 | |
| CN | 107835209 | A | 3/2018 | |
| CN | 107939346 | A | 4/2018 | |
| CN | 108519330 | A | 9/2018 | |
| CN | 109058762 | A | 12/2018 | |
| CN | 109100148 | A | 12/2018 | |
| CN | 109142826 | A | 1/2019 | |
| CN | 110047014 | A | 7/2019 | |
| CN | 110163411 | A | 8/2019 | |
| CN | 111222745 | A | 6/2020 | |
| CN | 111291958 | A | 6/2020 | |
| CN | 111524033 | A | 8/2020 | |
| CN | 111754028 | A | 10/2020 | |
| CN | 111967697 | A | 11/2020 | |
| CN | 112017074 | A | 12/2020 | |
| CN | 112944221 | A | 6/2021 | |
| CN | 112946231 | A | 6/2021 | |
| CN | 113221304 | A | 8/2021 | |
| DE | 10312620 | A1 | 10/2004 | |
| EP | 1843136 | A2 * | 10/2007 | ............. G06Q 30/04 |
| EP | 1884751 | A1 | 2/2008 | |
| EP | 2479542 | A1 | 7/2012 | |
| IN | 201921019548 | A | 11/2020 | |
| JP | H0546891 | A | 2/1993 | |
| JP | 2015204059 | | 11/2015 | |
| JP | 2019144897 | A | 8/2019 | |
| KR | 20170091421 | A | 8/2017 | |
| KR | 20200071805 | A | 6/2020 | |

OTHER PUBLICATIONS

First Office Action in Chinese Application No. 202110154145.7 mailed on Jan. 17, 2022, 15 pages.

Hu, Chunying et al., Scheduling Mode of Urban Natural Gas Peak, Proceedings of the Exchange Conference in Asia and the Western Pacific, 2006, 13 pages.

The Second Office Action in Chinese Application No. 202110154145.7 mailed on Apr. 1, 2022, 13 pages.

Decision to Grant a Patent for Invention in Chinese Application No. 202110154145.7 mailed on Jun. 22, 2022, 4 pages.

G. Ficco et al., Uncertainty Analysis of Energy Measurements in Natural Gas Transmission Networks, Flow Measurement and Instrumentation, 42: 58-68,2015.

Shao, Zehua, Research on Intelligent Gas Meter Cloud Platform, Gas & Heat, 38(3): B30-B34, 2018.

Yao, Hao et al., A Centralized Transcribing System's Design and Implementation, IOP Conference Series: Earth and Environmental Science, 2020,4 pages.

Li, Luguang et al. Study on the Implementation of Energy-Based Pricing for Natural Gas in China, Gas Industry, 2011, 7 pages.

An, Xiaoran et al., Optimization Example of Safety Precaution Technique for Medium-LOW Pressure Gas Regulators, Gas & Heat, 37(4): B21-B25, 2017.

Liao Deyun et al., Analysis and Treatment of Common Faults in Natural Gas Automatic Metering Systems, Metering Technology, Use and Maintenance, 2012, 5 pages.

Xie, Xiangzuo et al., The Development of the Natural Gas Energy Measurement Corrector, Instrumentation, 22(2): 92-95, 2020.

Liu, Bing et al, Application of Information-based Data Platform in Natural Gas Energy Metering, Information Technology & Control, 2020, 4 pages.

First Office Action in Chinese Application No. 202210043934.8 mailed on May 7, 2024, 20 pages.

Zhao, Guohong, Natural Gas Energy Measurement and Valuation, Chemical Enterprise Management, 5-6, 2021.

* cited by examiner

METHODS AND SYSTEMS FOR INTELLIGENT METERING OF NATRURAL GAS

CROSS-REFERENCE TO RELATED APPLICATION

This application is a Continuation of U.S. patent application Ser. No. 17/649,340 filed on Jan. 28, 2022, which claims the priority of Chinese Patent Application No. 202110154145.7 filed on Feb. 4, 2021 and Chinese Patent Application No. 202210043934.8 filed on Jan. 14, 2022, the contents of which are hereby incorporated by reference.

TECHNICAL FIELD

The present disclosure relates to the technical field of natural gas, in particular to a method and a system for intelligent metering of natural gas.

BACKGROUND

Since there may be multiple gas suppliers for the supply of natural gas, the energy contained in the volume unit of natural gas provided by each gas supplier may be different, so the volume unit prices of natural gas provided by different gas suppliers are different. On the other hand, the unit price of natural gas in the peak period of gas consumption in the gas consumption area may be different from that in other periods. Therefore, there is a need for a method that can accurately calculate the amount of natural gas consumption.

SUMMARY

One aspect of the embodiments of the present disclosure provides a method for intelligent metering of natural gas. The method may comprise: obtaining a metering value of the natural gas used by a user in a time period from a metering device via a network, the metering device being located at a gas supply terminal of a transmission pipe network, and determining a consumption amount of natural gas based on the metering value and a pricing scheme, wherein the pricing scheme includes a volume-based pricing scheme and an energy-based pricing scheme.

In some embodiments, a unit of the metering value is a volume unit and the volume-based pricing scheme includes a volume unit price of the natural gas in one volume unit.

In some embodiments, in the pricing scheme, volume units of the natural gas in different component types are the same, and volume unit prices of the natural gas in different component types are different.

In some embodiments, the volume unit prices of the natural gas in different component types are determined based on an adjustment model, the adjustment model being a deep neural network (DNN) model; the adjustment model is configured to determine adjusted energy per unit volume of the natural gas by processing energy per unit volume before adjustment and detection data of the natural gas, wherein the energy per unit volume before adjustment refers to an energy value released by combustion of per unit volume of natural gas output by a gas supplier, the detection data includes a temperature, a pressure, a component, a content, a flow, a compression factor, a density, and a calorific value of the natural gas output by the natural gas supplier; and, the volume unit prices of the natural gas are determined based on the adjusted energy per unit volume, wherein the adjusted energy per unit volume refers to an energy value generated by the combustion of natural gas per unit volume during the actual use of the user.

In some embodiments, in the pricing scheme, volume units of the natural gas in different component types are different, and volume unit prices of the natural gas in different component types are the same.

In some embodiments, the obtaining a metering value of the natural gas used by a user in a time period comprises: collecting an initial metering value of the natural gas used by a user in a time period based on the metering device, obtaining the metering value of the natural gas based on correction of the initial metering value by a correction model, the correction model being a DNN model.

In some embodiments, a first correction model, a second correction model and an energy difference model are obtained through joint training based on training samples, the trained first correction model or the trained second correction model is used as the correction model, and the joint training includes: inputting initial values of two kinds of natural gas to the first correction model and the second correction, respectively; inputting an output of the first correction model and the second correction model to the energy difference model; constructing a loss function based on an output and a label of the energy difference model; and obtaining the trained first correction model or the trained second correction model by iteratively updating the first correction model or second correction model based on the loss function.

In some embodiments, a unit of the metering value is an energy unit, and the energy-based pricing scheme includes an energy unit price of the natural gas in one energy unit.

In some embodiments, the obtaining a metering value of the natural gas used by a user in a time period comprises: determining the metering value of the natural gas used by the user in the time period based on a detection parameter obtained by a natural gas energy metering terminal, wherein the natural gas energy metering terminal is integrated by a variety of sensors, and, the detection parameter includes at least one of a temperature, a pressure, a composition, a content, a flow, a compression factor, a density, and a calorific value.

Another aspect of the embodiments of the present disclosure provides a system for intelligent metering of natural gas. The system may comprise: at least one storage device including a set of instructions, and, at least one processor in communication with the at least one storage device, wherein when executing the set of instructions, the at least one processor is configured to cause the system to perform at least one operation comprising: obtaining a metering value of the natural gas used by a user in a time period from a metering device via a network, the metering device being located at a gas supply terminal of a transmission pipe network, and, determining a consumption amount of natural gas based on the metering value and a pricing scheme, wherein the pricing scheme includes a volume-based pricing scheme and an energy-based pricing scheme.

In some embodiments, a unit of the metering value is a volume unit and the volume-based pricing scheme includes a volume unit price of the natural gas in one volume unit.

In some embodiments, in the pricing scheme, volume units of the natural gas in different component types are the same, and volume unit prices of the natural gas in different component types are different.

In some embodiments, the volume unit prices of the natural gas in different component types are determined based on an adjustment model, the adjustment model being a deep neural network (DNN) model, the adjustment model is configured to determine adjusted energy per unit volume of the natural gas by processing energy per unit volume before adjustment and detection data of the natural gas, wherein the energy per unit volume before adjustment refers to an energy value released by combustion of per unit volume of natural gas output by a gas supplier, the detection data includes a temperature, a pressure, a component, a content, a flow, a compression factor, a density, and a calorific value of the natural gas output by the natural gas supplier; the volume unit prices of the natural gas are determined based on the adjusted energy per unit volume, wherein the adjusted energy per unit volume refers to an energy value generated by the combustion of natural gas per unit volume during the actual use of the user.

In some embodiments, in the pricing scheme, volume units of the natural gas in different component types are different, and volume unit prices of the natural gas in different component types are the same.

In some embodiments, to obtain a metering value of the natural gas used by a user in a time period, the at least one processor is configured to cause the system to perform at least one operation comprising: collecting an initial metering value of the natural gas used by a user in a time period based on the metering device, obtaining the metering value of the natural gas based on correction of the initial metering value by a correction model, the correction model being a DNN model.

In some embodiments, a first correction model, a second correction model and an energy difference model are obtained through joint training based on training samples, the trained first correction model or the trained second correction model is used as the correction model, and the joint training includes: inputting initial values of two kinds of natural gas to the first correction model and the second correction, respectively; inputting an output of the first correction model and the second correction model to the energy difference model; constructing a loss function based on an output and a label of the energy difference model; and obtaining the trained first correction model or the trained second correction model by iteratively updating the first correction model or second correction model based on the loss function.

In some embodiments, a unit of the metering value is an energy unit, and the energy-based pricing scheme includes an energy unit price of the natural gas in one energy unit.

In some embodiments, to obtain a metering value of the natural gas used by a user in a time period, the at least one processor is configured to cause the system to perform at least one operation comprising: determining the metering value of the natural gas used by the user in the time period based on a detection parameter obtained by a natural gas energy metering terminal, wherein the natural gas energy metering terminal is integrated by a variety of sensors; and, the detection parameter includes at least one of a temperature, a pressure, a composition, a content, a flow, a compression factor, a density, and a calorific value.

Another aspect of the embodiments of the present disclosure provides a non-transitory computer readable medium storing instructions, when executed by at least one processor, causing the at least one processor to implement a method comprising: obtaining a metering value of the natural gas used by a user in a time period from a metering device via a network, the metering device being located at a gas supply terminal of a transmission pipe network, and determining a consumption amount of natural gas based on the metering value and a pricing scheme, wherein the pricing scheme includes a volume-based pricing scheme and an energy-based pricing scheme.

BRIEF DESCRIPTION OF THE DRAWINGS

The present disclosure will be further described in the form of exemplary embodiments, which will be described in detail by the accompanying drawings. These embodiments are not restrictive. In these embodiments, the same number represents the same structure, wherein:

FIG. 7 is a flow chart of another embodiment of the method for measuring energy of natural gas in a full cycle shown in some embodiments of the present disclosure.

DETAILED DESCRIPTION

Figure 1:
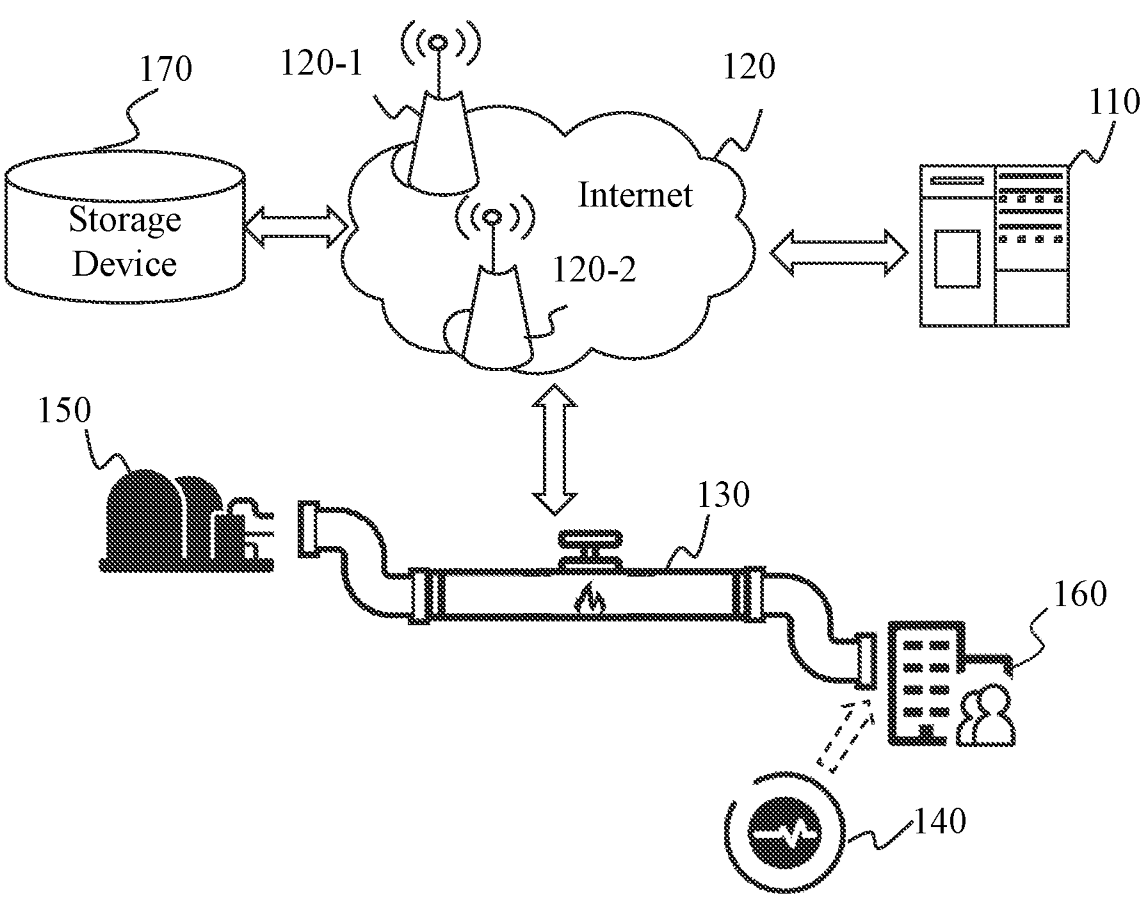
FIG. 1 is a schematic diagram of an application scenario of the system for measuring energy of natural gas in a full cycle shown in some embodiments of the present disclosure.

In order to more clearly explain the technical scheme of the embodiment of the present disclosure, the accompanying drawings required in the description of the embodiment will be briefly introduced below. Obviously, the drawings in the following description are only some examples or embodiments of the disclosure. For those skilled in the art, the resent disclosure can also be applied to other similar situations according to these drawings without paying creative labor. Unless obviously obtained from the context or the context illustrates otherwise, the same numeral in the drawings refers to the same structure or operation.

It should be understood that the "system", "device", "unit" and/or "module" used herein is a method for distinguishing different components, elements, parts or assemblies at different levels. However, if other words can achieve the same purpose, they can be replaced by other expressions.

As shown in the present disclosure, the words "one", and/or "this" do not specifically refer to the singular, but may also include the plural, unless there are specific exceptions. Generally speaking, the terms "include" only indicates that the clearly identified steps and elements are included, and these steps and elements do not constitute an exclusive list, and the method or equipment may also contain other steps or elements.

A flowchart is used in the present disclosure to explain the operation performed by the system according to the embodiment of the present disclosure. It should be understood that the foregoing or following operations may not necessarily performed exactly in order. Conversely, the operations may be implemented in an inverted order, or simultaneously. At the same time, other operations can also be added to these processes or to remove one step or step operation from these processes.

FIG. 1 is a schematic diagram of an application scenario of the system for measuring energy of natural gas in a full cycle shown in some embodiments of the present disclosure.

In some embodiments, based on the system for measuring energy of natural gas in a full cycle, the consumption amount of natural gas can be determined by implementing the methods and/or processes disclosed in this disclosure.

As shown in FIG. 1, application scenario 100 may include a processing device 110, a network 120, a transmission pipe network 130, a metering device 140, a transmission station 150, a gas consumption area 160, and a storage device 170.

Processing device 110 may be used to process data and/or information from at least one component of application scenario 100 or an external data source (e.g., a cloud data center). Processing device 110 may access data and/or information from transmission pipe network 130, metering device 140, transmission station 150, gas consumption area 160 and storage device 170 through network 120.

Processing device 110 may be directly connected to metering device 140 to access information and/or data. For example, processing device 110 may obtain volumetric energy data of natural gas output and/or data such as temperature and pressure values of natural gas from metering device 140. For example, the processing device can calculate the actual volume energy of natural gas based on the output volume energy data and the temperature and pressure values of natural gas, so as to calculate the actual consumption amount. In some embodiments, processing device 110 may be a single server group. Processing device 110 may be local and remote. Processing device 110 may be implemented on a cloud platform.

Network 120 may include any suitable network providing information and/or data exchange capable of promoting application scenario 100. In some embodiments, information and/or data may be exchanged between one or more components of application scenario 100 (E. G., processing device 110, transmission pipe network 130, metering device 140, transmission station 150, gas area 160, and storage device 170) through network 120.

In some embodiments, network 120 may be any one or more of a wired network or a wireless network. In some embodiments, network 120 may include one or more network access points. For example, network 120 may include wired or wireless network access points, such as base stations and/or network switching points 120-1, 120-2, . . . , through which one or more components of scenario 100 may be connected to network 120 to exchange data and/or information.

Transmission pipe network 130 may be used to transport natural gas from transmission station 150 to gas consumption area 160. In some embodiments, a plurality of off load pipelines are provided in the transmission pipe network 130 for connection with a plurality of transmission stations and a plurality of gas consumption areas 160. In some embodiments, a plurality of gas consumption areas 160 may be provided with a plurality of pipe networks according to the size of gas consumption and air pressure. In some embodiments, transmission pipe network 130 is provided with metering device 140 for metering the transmission amount of natural gas.

Metering device 140 may be configured to measure the transmission volume and the components, temperature, pressure and other data of natural gas. In some embodiments, metering device 140 may be arranged at the gas transmission node of the transmission pipe network and collect the natural gas output data of the gas transmission node. In some embodiments, metering device 140 may be arranged at the gas supply terminal or gas supply node of the transmission pipe network and collect energy and/or volume data of the natural gas from the gas supply terminal or gas supply node.

Transmission station 150 may be configured to transmit the natural gas in the natural gas trunk pipe network or natural gas storage to gas consumption area 160 through transmission pipe network 130. In some embodiments, transmission station 150 may be provided with a natural gas energy metering terminal, which may be configured to monitor the performance parameters of the natural gas in the transmission station, such as pressure, temperature, flow, component, etc. In some embodiments, transmission station 150 may adjust transmission parameters such as transmission pressure and transmission flow of natural gas.

In some embodiments, transmission station 150 may be provided with a metering device for metering natural gas output data, such as output natural gas energy and/or volume data. In some embodiments, transmission station 150 may transmit the statistical output data to processing device 110 over network 120.

Gas consumption area 160 refers to the terminal area consuming natural gas. In some embodiments, gas consumption area 160 may include an urban residential gas consumption area, a natural gas filling station area, an urban central heating area, a natural gas power generation area, an industrial gas consumption area, etc.

Storage device 170 can store data, instructions, and/or other information. In some embodiments, storage device 170 may obtain and store data from processing device 110, transmission pipe network 130, gas consumption area 160, metering device 140 and transmission station 150 through the network, or may store the natural gas data processed and analyzed by processing device 110.

In some embodiments, system for measuring energy of natural gas in a full cycle may include an acquisition module and a pricing module.

The acquisition module is configured to obtain a metering value of the natural gas used by a user in the time period based on a metering device. In some embodiments, the unit of the metering value may be a volume unit. In some embodiments, the acquisition module may include a metering device and an energy metering terminal. In some embodiments, the metering device may be configured to collect an initial metering value of the natural gas used by a user in the time period. It also may be configured to obtain the metering value of the natural gas based on correction of the initial metering value by a correction model. For a detailed description of the correction model, please refer to FIG. 6 of the present disclosure. The volume unit can represent the consumption of natural gas by volume, for example, one volume unit can be one cubic meter.

The initial metering value can be the original metering value of the natural gas transmitted from each gas supplier (i.e., the end of transmission pipe network 130), and the original metering value can be provided by each natural gas supplier. The initial metering value may also be obtained based on metering device 140 of gas consumption area 160.

In some embodiments, the unit of the metering value may be an energy unit, and the acquisition module may determine a metering value of the natural gas used by a user in a time period based on the detection parameter obtained by the energy metering terminal of the natural gas. In some embodiments, the detection parameter includes at least one of a temperature, a pressure, a component, a content, a flow, a compression factor, a density and a calorific value.

The pricing module is configured to determine a consumption amount of the natural gas based on the metering value and the pricing scheme. In some embodiments, when the metering value is a volume unit, the pricing scheme may include the volume unit price of natural gas in one volume unit. In some embodiments, volume units of the natural gas in different component types are the same, and the volume unit prices are different. The volume unit prices of the natural gas in different component types may be determined based on the adjustment model.

In some embodiments, the adjustment model is configured to determine adjusted energy per unit volume of the natural gas by processing energy per unit volume before adjustment and detection data of the natural gas. Then the adjustment module may determine the volume unit prices of the natural gas based on the adjusted energy per unit volume. See FIG. 3 for a detailed description of the adjustment model.

In some embodiments, the volume units of the natural gas in different component types are different, and the volume unit prices are the same. The volume units of the natural gas are different, and the volume unit prices are the same, that is, in the case of the same volume unit prices, the volume of the corresponding natural gas may be different. For example, due to the different natural gas suppliers or different time periods, the natural gas components provided by the suppliers are not the same, and the energy provided by different types of natural gas of the same volume may be different. By adjusting the corresponding volume of different types of natural gas, different types of natural gas may produce the same energy. When the energy is the same, the unit prices are also the same, and at this time, the volume corresponding to the same unit price is different.

In some embodiments, when the unit of the metering value is an energy unit, the pricing scheme includes the energy unit prices of the natural gas in one energy unit.

It should be understood that the system scenario and its modules shown in FIG. 1 can be implemented in various ways. For example, in some embodiments, in the scenario 100, the natural gas data of the gas supplier and the user terminal within one cycle may be detected and analyzed, and then calculate the natural gas volume unit price and/or energy unit price. In some embodiments, the scenario 100 may also detect and analyze the natural gas data of the gas supplier and user area in real time, and calculate the natural gas volume and/or energy unit price in real time.

It should be noted that the above description of the system for measuring energy of natural gas in a full cycle and its modules is only for convenience of description, and cannot limit this disclosure to the scope of the embodiments. It can be understood that after understanding the principle of the system, those skilled in the art may arbitrarily combine each module or form a subsystem to connect with other modules without departing from this principle. In some embodiments, the acquisition module and pricing module disclosed in FIG. 1 may be different modules in a system, or one module may realize the functions of the above two or more modules. For example, each module may share one storage module, and each module may also have its own storage modules. Such deformation is within the protection scope of this disclosure.

Figure 2:
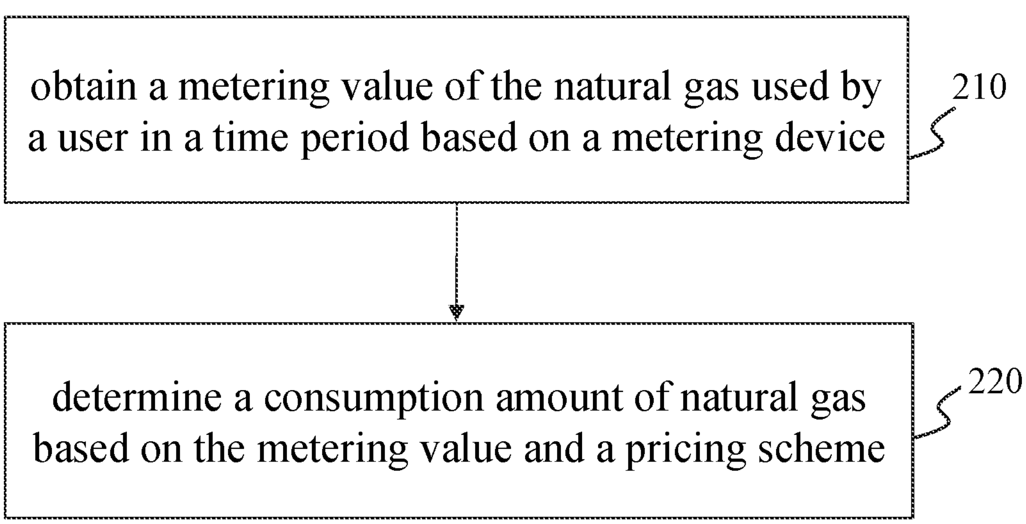
FIG. 2 is an exemplary flow diagram of the method for measuring energy of natural gas in a full cycle shown in some embodiments of the present disclosure.

FIG. 2 is an exemplary flow diagram of the method for measuring energy of natural gas in a full cycle shown in some embodiments of the present disclosure. As shown in FIG. 2, process 200 includes the following steps. In some embodiments, process 200 may be performed by processing device 110.

Step 210, obtain a metering value of the natural gas used by a user in the time period. In some embodiments, step 210 is performed by the acquisition module.

The time period refers to the time period when the amount of natural gas used by a user that is needs to measured, for example, from January 1 to January 10, or from 8:00 to 10:00 on January 1.

The metering value of natural gas may represent the amount of natural gas used by a user in the time period. In some embodiments, it may be obtained based on the output amount counted by the gas supplier or through a metering device in the user's terminal.

In some embodiments, the metering value may be a volume metering value. That is, the consumption of natural gas is measured by volume. In some embodiments, the metering value may be an energy metering value, that is, the consumption of natural gas is calculated by energy.

The metering value of natural gas may be obtained through a metering device 160, which may be a metering device of the gas supplier or a metering device of the user. The types of a metering device may include membrane gas meter, gas waist wheel (roots) gas meter, gas turbine gas meter, etc. See FIG. 3 and FIG. 4 for more instructions on obtaining the metering value.

Step 220, determine a consumption amount of natural gas based on the metering value and a pricing scheme. In some embodiments, step 220 is performed by the pricing module.

The pricing scheme is the calculation scheme of consumption amount based on the metering value of natural gas used by a user. In some embodiments, the pricing scheme may include a volume-based pricing scheme and an energy-based pricing scheme. See FIG. 3 for more description of the pricing scheme based on volume pricing and FIG. 5 for more description of the pricing scheme based on energy pricing.

Determining consumption amount refers to determining the consumption amount of natural gas used by a user based on the pricing scheme and the corresponding metering value. For example, volume-based pricing, that is, when the metering value is volume, the consumption amount is determined by calculating the volume and volume unit price of natural gas used by a user. Another example is energy-based pricing, that is, when the metering value is energy, the consumption amount is determined by calculating the energy and energy unit price of the natural gas used by a user.

It should be noted that the above description of process 200 is only for example and explanation, and does not limit the scope of application of this disclosure. For those skilled in the art, various modifications and changes can be made to process 200 under the guidance of this disclosure. However, these amendments and changes are still within the scope of this disclosure.

Figure 3:
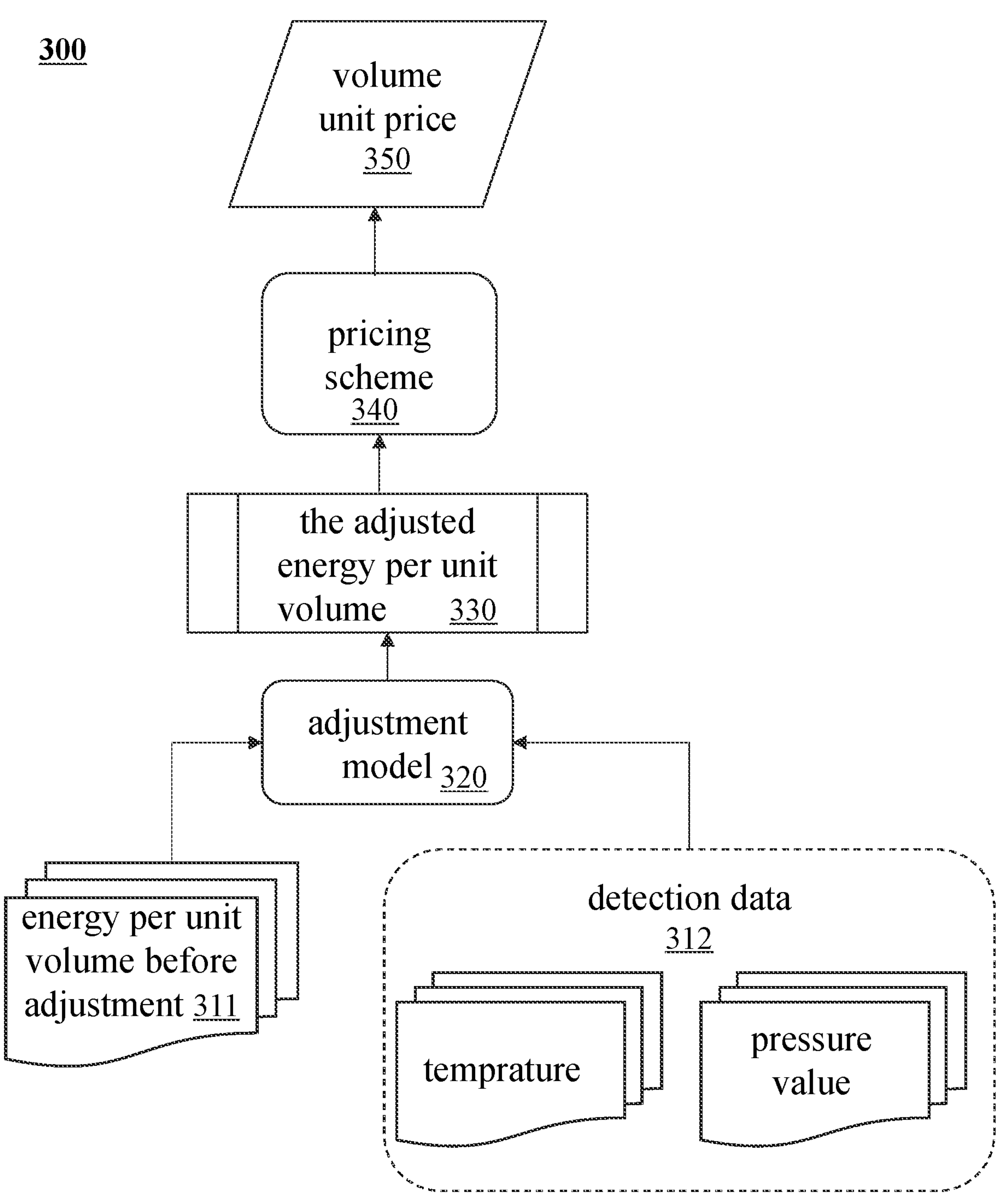
FIG. 3 is a schematic diagram of a pricing manner in the method for measuring energy of natural gas in a full cycle shown in some embodiments of the present disclosure.

FIG. 3 is a schematic diagram of a pricing manner in the method for measuring energy of natural gas in a full cycle shown in some embodiments of the present disclosure.

In some embodiments, the metering value may be a volume value, and the unit of the metering value may be a volume unit.

The volume value refers to the volume data corresponding to natural gas, and the volume unit may be the concept of standard quantity used to measure the volume of natural gas. In some embodiments, natural gas may be measured in a variety of metering units. For example, cubic meters ($m^3$), cubic feet (CF), standard cubic meters (N $m^3$), and so on.

Volume unit price refers to the price corresponding to a volume unit of natural gas. In some embodiments, the volume unit price corresponding to different metering methods may be different. For example, the price of 1 cubic meter of natural gas of type A is 2.5 yuan, the price of the natural gas of type A of 1 standard cubic meter is 6.2 yuan. In some embodiments, the volume unit price of natural gas may be uniformly priced based on industry regulations, or priced according to the gas supplier.

Pricing scheme 340 refers to the reference standard for natural gas usage and billing formulated by the gas supplier. In some embodiments, the user's consumption amount of natural gas may be calculated based on the unit price corresponding to different metering values and/or different metering units in the pricing scheme.

In some embodiments, the pricing scheme may include a volume unit price of natural gas in one volume unit. For example, the price of a cubic meter of natural gas with a methane content of 70% is 2.5 yuan.

In some embodiments, in some pricing schemes, the volume units of natural gas with different composition types are different and the volume unit price is the same. The specific content of the pricing manner in this case may refer to FIG. 4 and its detailed description, which will not be repeated here.

In some embodiments, in some pricing schemes, the volume units of natural gas in different composition types are the same, but the volume unit prices are different. For example, the price of one cubic meter of natural gas with 70% methane content is 2.5 yuan, the price of natural gas with a methane content of 75% per cubic meter is 2.8 yuan.

The composition type of natural gas refers to the main composition of natural gas, for example, methane, ethane, nitrogen, hydrogen sulfide, etc. In some embodiments, natural gas with different components may be generated due to differences in factors such as origin, generation state and occurrence of natural gas, or the content of components constituting natural gas may be different.

In some embodiments, the composition type of natural gas may be measured by a metering device, such as a meteorological chromatographic analyzer.

In some embodiments, based on natural gas with different components and natural gas with the same volume unit, the energy generated by combustion may be different, so the volume unit price may be different. For example, the more energy generated after natural gas combustion, the higher its volume unit price may be. For example, the energy released when burning a cubic meter of natural gas with a methane content of 70% is 36 MJ, and the corresponding price is 2.5 yuan/m$^3$, the energy released when burning 1 cubic meter of natural gas with 75% methane is 40 MJ, and the corresponding price is 2.8 yuan/m$^3$.

Through the above embodiments, a natural gas pricing manner of volume pricing may be provided based on the above pricing scheme, which is convenient for the management platform to flexibly select a more appropriate pricing scheme.

In some embodiments, the volume unit prices of natural gas in different composition types may be determined based on adjustment model 320. In some embodiments, adjustment model 320 may determine adjusted energy per unit volume of natural gas by processing energy per unit volume before adjustment and detection data of the natural gas. Further, the volume unit prices of natural gas are determined based on the adjusted energy per unit volume.

Energy per unit volume refers to the energy released by the combustion of natural gas per unit volume. For example, the energy released by the combustion of the natural gas A provided by a natural gas company per cubic meter is 36 MJ.

Energy per unit volume before adjustment 311 refers to the energy value released by combustion of per unit volume of natural gas output by the gas supplier. In some embodiments, the energy per unit volume before adjustment may be determined by the gas supplier by experiments. For example, the unit volume energy value before adjustment is 36 MJ.

The adjusted energy per unit volume 330 refers to the energy value generated by the combustion of natural gas per unit volume during the actual use of the user. For example, the adjusted unit volume energy value is 33 MJ. In some embodiments, the volume unit price of natural gas per unit volume may be determined based on the adjusted energy per unit volume.

The detection data 312 refers to the relevant index parameters of natural gas. In some embodiments, the detection data 312 may include the temperature value, pressure value, etc. of the natural gas output by the natural gas supplier. In some embodiments, detection data 312 may collect corresponding detection data through the detection device. For example, the temperature value of natural gas may be obtained through a temperature sensor, and the pressure value of natural gas may be obtained through a pressure sensor.

In some embodiments, adjustment model 320 may determine adjusted energy per unit volume of the natural gas by processing energy per unit volume before adjustment and detection data of the natural gas.

In some embodiments, the type of adjustment model 320 may be varied. For example, adjustment model 320 may be a CNN model, a DNN model, or the like.

In some embodiments, the input of adjustment model 320 includes the characteristics of energy per unit volume before adjustment 311 and detection data 312. The output of adjustment model 320 includes adjusted energy per unit volume 330.

In some embodiments, the processing device may train the initial adjustment model based on multiple sets of training data to obtain the adjustment model. Each group of training data includes at least one data feature of energy per unit volume before adjustment and detection data, and the labels of each group of training data represent the energy value.

In some embodiments, a loss function may be constructed from the labels and results of the initial adjustment model, and the parameters of the adjustment model may be iteratively updated based on the loss function. When the loss function of the initial adjustment model meets the preset conditions, the model training is completed and the trained adjustment model is obtained. Among them, the preset conditions may be the convergence of the loss function, the number of iterations reaching the threshold, etc.

In some embodiments, volume unit price 350 of the natural gas may be determined based on the adjusted energy per unit volume.

In some embodiments, volume unit price 350 may be determined according to the adjusted energy per unit volume based on pricing scheme 340 and compared with the corresponding volume energy value. For example, when the energy per unit volume before adjustment is 36 MJ/m$^3$, the volume unit price is 2.5 yuan/m$^3$, when the adjusted energy per unit volume is 33 MJ/m$^3$, the volume unit price is updated to 2.24 yuan/m$^3$.

Through some of the above embodiments, the value of energy per unit volume may be determined by obtaining the easily obtained detection data, so as to reduce the difficulty of the detection data, so as to efficiently obtain a more reasonable consumption amount of natural gas.

Figure 4:
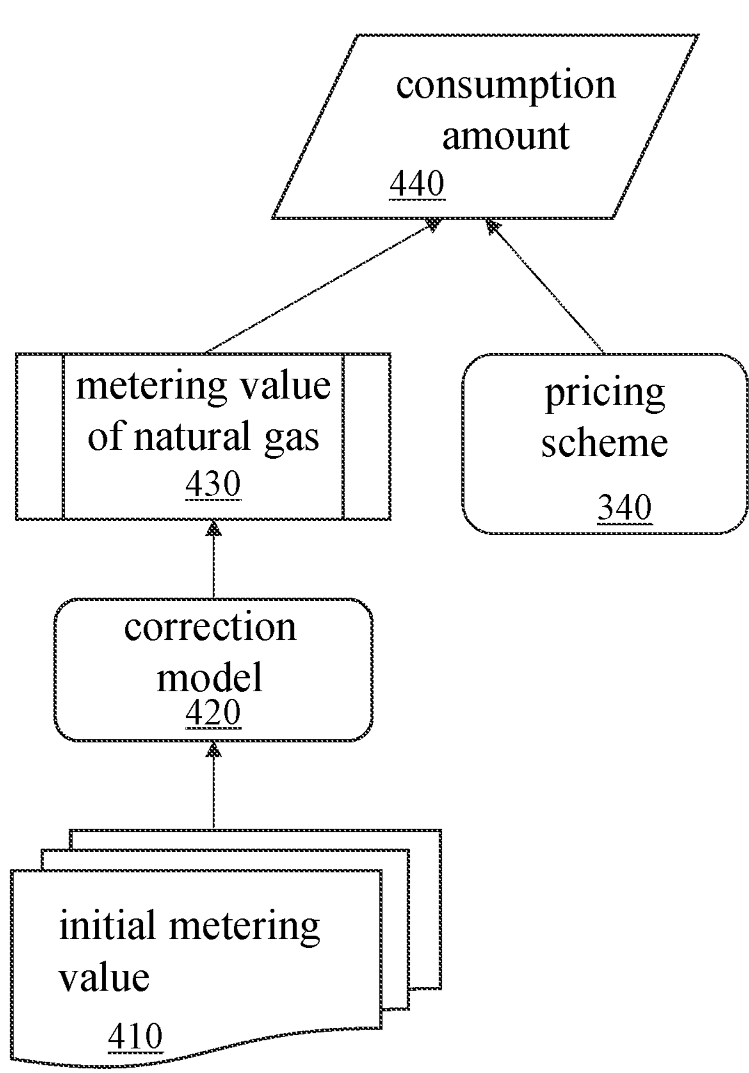
FIG. 4 is a schematic diagram of a pricing manner in the method for measuring energy of natural gas in a full cycle shown in some embodiments of the present disclosure.

FIG. 4 is a schematic diagram of a pricing manner in the method for measuring energy of natural gas in a full cycle shown in some embodiments of the present disclosure.

In some embodiments, some pricing schemes 340 have different volume units and the same volume unit price of natural gas with different composition types.

In some embodiments, different volume units of natural gas of different composition types mean that different types of natural gas produce the same energy based on different volumes by adjusting the volume units corresponding to different types of natural gas, wherein the unit price of natural gas corresponding to different volume units is the same. For example, the volume unit of natural gas A is cubic meter, the volume unit of natural gas B is cubic decimeter. If 1 cubic meter of natural gas A and 1 cubic decimeter of natural gas B release the same energy during combustion, the price of 1 cubic meter of natural gas A and 1 cubic decimeter of natural gas B is the same, so that different types of natural gas release the same energy at the same unit price.

In some embodiments, the initial metering value of natural gas used by a user during the time period may be collected based on the metering device.

Initial metering value 410 of natural gas refers to the volume values of natural gas at the time of output counted by the gas supplier or the volume values of natural gas consumed counted by the user.

In some embodiments, the initial metering value 410 of natural gas can be acquired by a metering device. The metering device refers to the metering instruments used to obtain natural gas related parameters, such as membrane gas meter, gas waist wheel (roots) gas meter and gas turbine gas meter used to obtain natural gas volume data.

In some embodiments, the initial metering value may be corrected based on correction model 420 to obtain metering value of natural gas 430. Further, consumption amount 440 is obtained based on metering value of natural gas 430 and pricing scheme 340.

In some embodiments, the types of correction model 420 may be various. For example, the correction model 420 may be a type of CNN model, a DNN model, or the like.

In some embodiments, the input of correction model 420 includes an initial metering value, and the output includes the corrected metering value of natural gas 430.

In some embodiments, correction model 420 may be trained based on a plurality of sets of training data. The specific structure and training of the correction model may be described in detail with reference to FIG. 6, which will not be repeated here.

In some embodiments, final consumption amount 450 may be obtained based on metering value of natural gas 430 and pricing scheme 340. For example, the methane content of natural gas A is 70%, the energy released during combustion of 1 $m^3$ is 36 MJ, and the corresponding price is 2.5 yuan/$m^3$, the initial methane content of natural gas B is 75%, and the energy released during combustion of 1 $m^3$ is 40 MJ, and the corresponding price is 2.8 yuan/$m^3$. After correction, the energy released by natural gas B per 0.93 $m^3$ is 36 MJ, and the price is 2.5 yuan/0.93 $m^3$. If user A uses V1 volume of natural gas A and V2 volume of natural gas B, the final consumption amount of the user is 2.5*(V1+V2/0.93) yuan.

Through some of the above embodiments, the corresponding volumes of different types of natural gas are adjusted based on the correction model, so that different types of natural gas produce the same energy under the volume corresponding to the same unit price, so as to obtain a more reasonable pricing manner.

Figure 5:
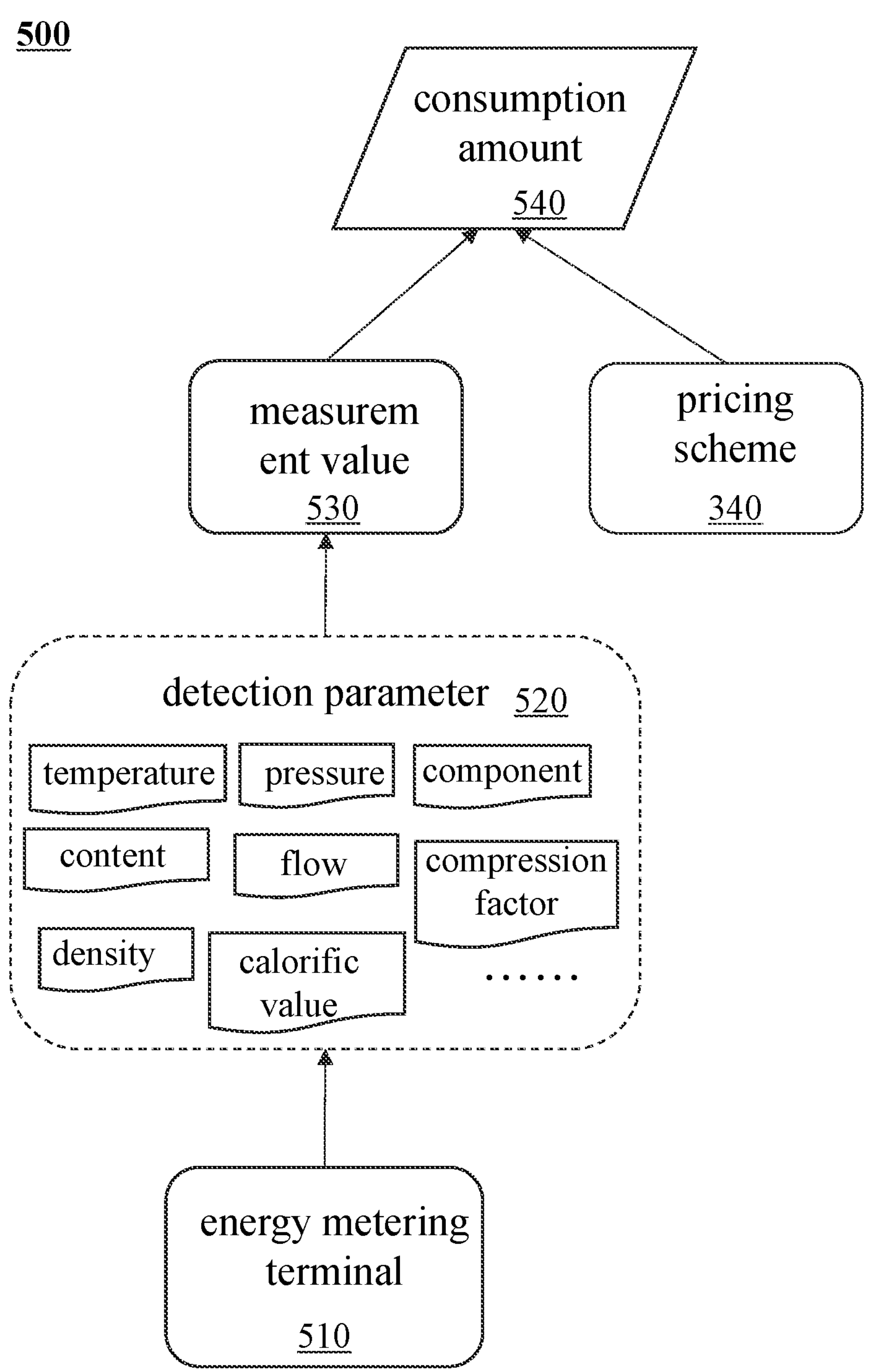
FIG. 5 is a schematic diagram of a pricing manner in the method for measuring energy of natural gas in a full cycle shown in some embodiments of the present disclosure.

FIG. 5 is a schematic diagram of a pricing manner in the method for measuring energy of natural gas in a full cycle shown in some embodiments of the present disclosure.

FIG. 5 shows a pricing manner when the metering value is energy data. In some embodiments, pricing scheme 340 includes an energy unit price of natural gas for one energy unit.

Energy unit refers to the unit corresponding to the energy value released by the combustion of natural gas with specified volume parameters under corresponding environment. In some embodiments, energy unit may be kilocalorie/standard cubic meter (kcal/$Nm^3$), megacalorie/standard cubic meter (Mcal/$Nm^3$), megajoule/standard cubic meter (MJ/$Nm^3$), etc.

Energy unit price refers to the corresponding price of natural gas under an energy unit. For example, the price per 10 MJ/$Nm^3$ is 0.6 yuan.

Natural gas energy metering terminal 510 is used to collect various information of natural gas. In some embodiments, the natural gas energy metering terminal may be integrated by a variety of sensors.

In some embodiments, the content collected by the natural gas energy metering terminal may include temperature, pressure, component, content, flow, compression factor, density, calorific value, etc. For example, a component sensor such as a gas chromatograph is used to measure the gas component and content, gas measuring instruments, such as ultrasonic flowmeter, membrane gas meter, turbine flowmeter, orifice flowmeter, nozzle flowmeter, precession vortex flowmeter, volumetric flowmeter, mass flowmeter, flow totalizer and flow computer, may be used to collect the volume flow or mass flow of gas. A temperature sensor is used to measure the temperature of natural gas. A pressure sensor is used to measure the pressure of natural gas. The compression factor, density, calorific value and other physical parameters shall be provided by the gas supplier.

Detection parameter 520 refers to various information data about natural gas, for example, temperature, pressure, volume, component, flow, etc.

In some embodiments, the natural gas energy metering terminal is set at the gas supply terminal or gas supply node, collects the natural gas detection parameter of the gas supply terminal or gas supply node, and obtains the energy value based on the natural gas detection parameter. For example, obtaining chromatographic data of natural gas samples through chromatographic sensors, obtaining the volume data of the natural gas sample through the ultrasonic sensor. When the energy metering terminal receives the natural gas metering data, the energy data corresponding to the volume data is obtained according to the chromatographic data and volume data.

In some embodiments, the energy value of natural gas may be determined using the energy value calculation formula. As shown in formula (1):

$$E=\tilde{H}[t_1,V(t_2,p_2)]\times V_n \tag{1}$$

wherein, $\tilde{H}[t_1,V(t_2,p_2)]$ represents the calorific value of the real volume of natural gas, $t_1$ represents the temperature of combustion reference conditions, $t_2$ represents the temperature of metering reference conditions, $p_2$ represents the metering reference pressure, and $V_n$ represents the flow volume of natural gas under standard conditions (20° C., a standard atmospheric pressure).

The specific technical scheme for energy value calculation may be as follows:

Step 1: the gas metering device (such as the natural gas energy metering terminal) receives the natural gas component data measured by the gas chromatograph.

Step 2: the gas metering device receives the natural gas pressure data $P_t$ collected in real time by the pressure sensor and the temperature data $T_t$ collected in real time by the temperature sensor, and calculates the temperature $t_2$ of metering reference conditions and the compression factor $Z_{mix}$ under the pressure $p_2$ under the pressure $p_2$ according to $P_t$ and $T_t$.

Step 3: the gas metering device calculates the real volume calorific value $\tilde{H}[t_1,V(t_2,p_2)]$ of natural gas as real gas according to the component and compression factor $Z_{mix}$ of natural gas. The real volume calorific value $\tilde{H}[t_1,V(t_2,p_2)]$ is: under the temperature $t_1$ of combustion reference conditions and pressure $p_1$, the volume calorific value of the unit volume of natural gas under the temperature $t_2$ of metering reference conditions and pressure $p_2$.

Step 4: the flow counting unit of the gas metering device measures the volume consumption $V_t$ of natural gas under the actual temperature and pressure, and converts the volume consumption $V_t$ of natural gas into the volume flow $V_n$ of natural gas under the temperature $t_2$ of metering reference conditions and pressure $p_2$.

Step 5: the gas metering device determines the energy E of natural gas based on formula (1) according to the real volume calorific value $\tilde{H}[t_1,V(t_2,p_2)]$ and volume flow $V_n$ of natural gas to complete energy metering.

In some embodiments, consumption amount 540 may be determined based on final measurement value 530 and pricing scheme 340. For example, in the pricing scheme, the price corresponding to each 10 MJ/N $m^3$ natural gas is 0.6 yuan. After calculation, if a user uses 1000 MJ of natural gas, the user's consumption amount is 60 yuan.

Through some of the above embodiments, the consumption amount may also be determined based on the same energy value when the user uses natural gas with different volumes and components.

Figure 6:
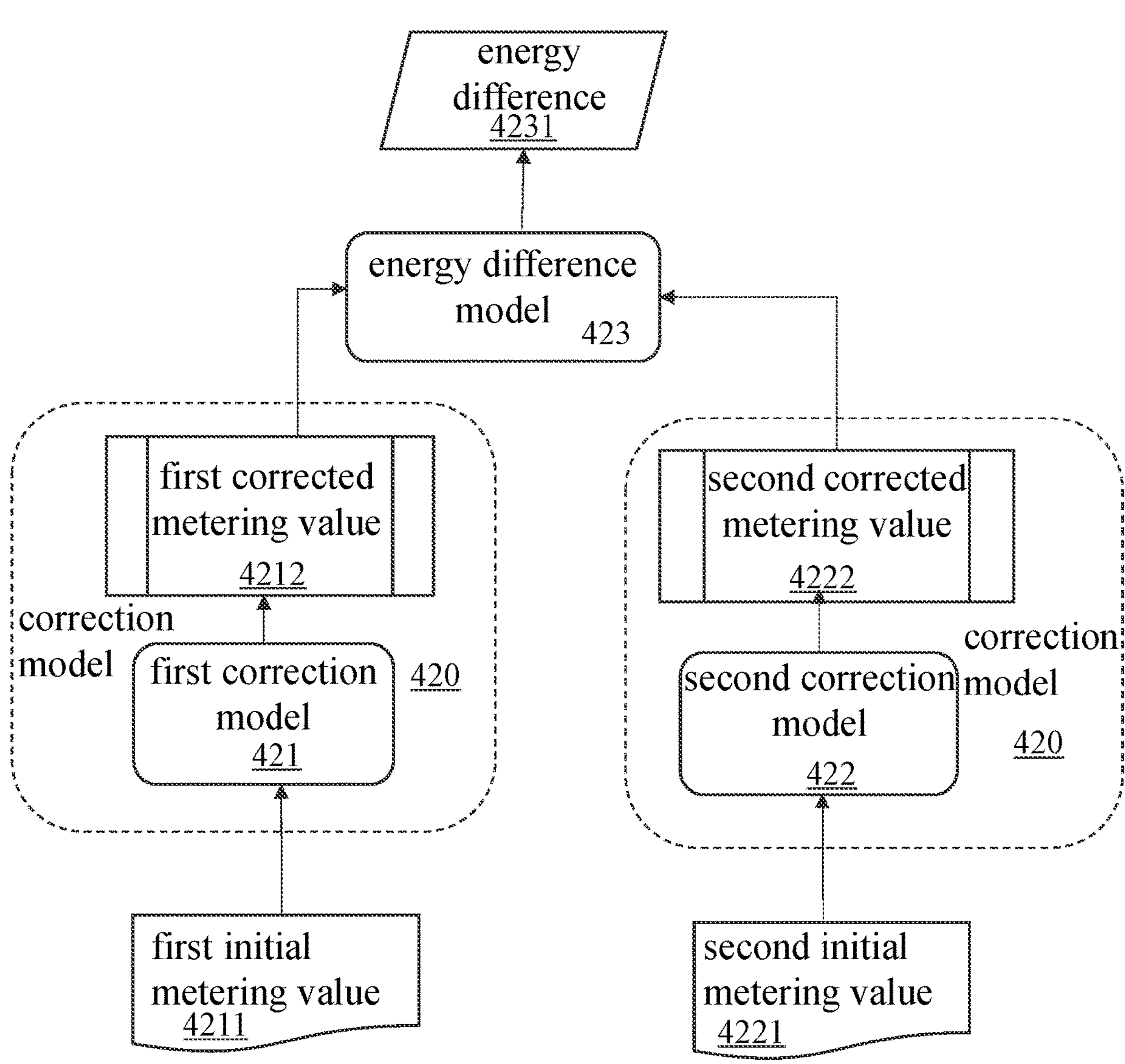
FIG. 6 is a schematic diagram of the correction model in the method for measuring energy of natural gas in a full cycle shown in some embodiments of the present disclosure.

FIG. 6 is a schematic diagram of the correction model in the method for measuring energy of natural gas in a full cycle shown in some embodiments of the present disclosure.

Correction model 420 may be used to correct the initial metering value to the metering value of natural gas. In some embodiments, correction model 420 may be a machine learning model, which may include, but is not limited to, one or more of a neural network model, a graph neural network model, a support vector machine model, a k-nearest neighbor model, a decision tree model, and the like.

In some embodiments, the input of correction model 420 includes an initial metering value, such as an initial volume value of natural gas, the output includes the metering value, i.e., the target volume value of natural gas.

As shown in FIG. 6, correction model may be obtained based on trained first correction model 421 or trained second correction model 422.

In some embodiments, the input of first correction model 421 may include a first initial metering value 4211. For example, when the gas supplier outputs, the volume value of natural gas obtained by the detection device. The output of the first correction model may include first corrected metering value 4212.

In some embodiments, the input of second correction model 422 may include second initial metering value 4221. For example, when the gas supplier outputs, the volume value of natural gas obtained by the detection device. The output of the first correction model may include first corrected metering value 4212.

In some embodiments, the initial metering values input in the first correction model and the second input model may be two different natural gas. For example, the first initial metering value input by the first correction model may be the relevant parameters of natural gas with a methane content of 70%. The initial metering value input by the second correction model may be the relevant parameters of natural gas with methane content of 75%.

In some embodiments, the input of energy difference model 423 may include first corrected metering value 4212 and second corrected metering value 4222, the output may include energy difference 4231.

In some embodiments, the parameters of correction model 420 may be obtained by training first correction model 421 or second correction model 422. In some embodiments, first correction model 421 and second correction model 422 have the same structure as correction model 420. First correction model 421 and second correction model 422 may be DNN models.

In some embodiments, the parameters of the first correction model and the second correction model may be shared.

In some embodiments, the first correction model, the second correction model and the energy difference model may be obtained through joint training based on training samples. In some embodiments, the trained first correction model or the second correction model may be used as the correction model.

In some embodiments, the training samples of the first correction model and the second correction model may include a variety of historical natural gas initial volume values. The label may be the energy difference value corresponding to the initial volume values of two kinds of natural gas input to the first correction model and the second correction model, and the label may be obtained by manual marking.

In some embodiments, the outputs of the first correction model and the second correction model are used as the input of the energy difference model, the loss function is constructed based on the output and label of the energy difference model, and the parameters of the first correction model, the second correction model and the energy difference model are iteratively updated based on the loss function until the preset conditions are met and the training is completed. After training, the parameters of the correction model may also be determined.

Obtaining the parameters of the correction model through the above training method is helpful to solve the problem that it is difficult to obtain labels when training the correction model alone in some cases.

The possible beneficial effects of the embodiment of this disclosure include but are not limited to: (1) the value of unit volume energy may be determined by obtaining easily available detection data, so as to reduce the difficulty of detection data, so as to obtain a more efficient and reasonable consumption amount of natural gas; (2) adjust the corresponding volume of different types of natural gas based on the correction model to make different types of natural gas produce the same energy, so as to obtain a more reasonable pricing manner; (3) when users use natural gas with different volumes and components, the consumption amount may also be determined based on the same energy value.

Figure 7:
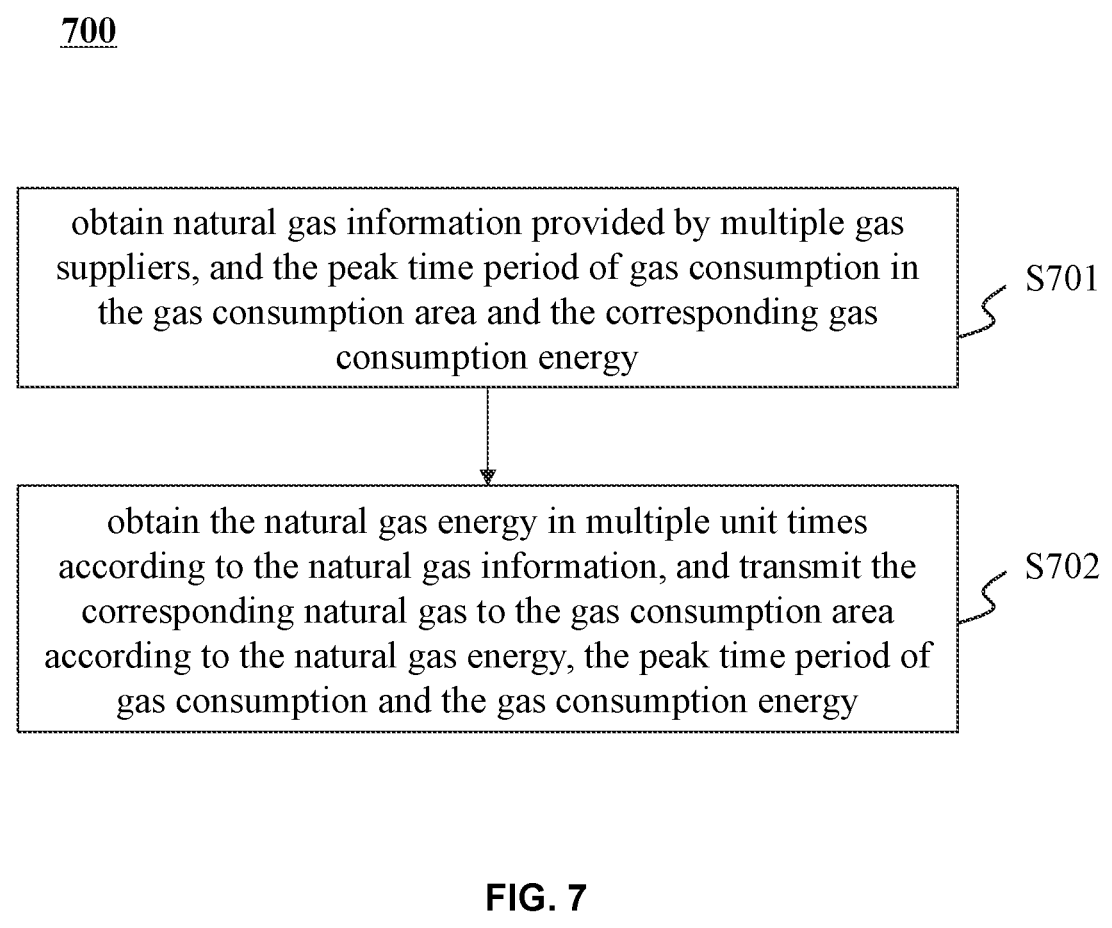

FIG. 7 is a flow chart of another embodiment of the method for measuring energy of natural gas in a full cycle shown in some embodiments of the present disclosure. The method for measuring energy of natural gas in a full cycle is based on the system for measuring energy of natural gas. In some embodiments, the system for measuring energy of natural gas in a full cycle may also include a successively interactive sensing control platform, a sensing network platform and a management platform.

The sensing control platform for collecting natural gas information provided by multiple gas suppliers. It includes a component sensor, a gas metering device, a temperature sensor and a pressure sensor. The component sensor is configured to collect the component and content of natural gas. The gas measuring instruments are configured to collect the flow of natural gas. The temperature sensor is configured to collect temperature of natural gas. The pressure sensor is configured to collect the pressure of natural gas. The flow, compression factor, density and calorific value shall be provided by the gas supplier.

In some embodiments, the sensing control platform is also used to collect the gas peak time periods of different gas consumption areas and the gas energy corresponding to the gas peak time periods.

The sensing network platform is configured to transmit the natural gas information collected by the sensing control platform, the gas peak time periods of different gas consumption areas and the gas energy corresponding to different gas peak time periods to the management platform.

The management platform is used to obtain the corresponding natural gas energy per unit time according to the natural gas information provided by the gas supplier, and transmit the natural gas provided by the corresponding gas supply company to the gas consumption area according to the natural gas energy per unit time, the gas consumption peak time period and the gas consumption energy corresponding to the gas consumption peak time period.

In some embodiments, when the management platform receives the natural gas information provided by any gas supplier, the energy metering module of the management platform will calculate the natural gas energy per unit time of the natural gas according to the corresponding natural gas temperature, natural gas pressure, natural gas composition, natural gas content, natural gas flow, natural gas compression factor, natural gas density and natural gas calorific value. At the same time, the natural gas provided by different gas suppliers is allocated according to the gas peak time period of different gas consumption areas and the gas energy corresponding to the gas peak time period, so that the natural gas provided by the gas supplier with high natural gas energy per unit time may be allocated to the gas consumption areas with high gas energy during the gas peak time period, the natural gas with low natural gas energy per unit time is allocated to the gas consumption area with low gas energy, so as to solve the problem of insufficient natural gas supply during the peak time of gas consumption.

Since the gas suppliers of natural gas companies are not unique, and the content or component of natural gas provided by different gas suppliers are different, the natural gas energy provided by different gas suppliers in unit time is different. The natural gas pipe network is laid according to the size of the gas consumption area and the approximate total gas consumption of the gas consumption area. When the natural gas pipe network is laid, the volume of natural gas imported by the natural gas company to the gas consumption area is also fixed. Therefore, according to the current pipe network laying method, there will be insufficient gas supply when there is a gas consumption peak.

Based on this, the scheme optimizes the gas supply mode of natural gas under the condition of existing pipe network, that is, match the natural gas energy generated by natural gas provided by different gas suppliers in unit time and the gas energy required in different gas peak time periods, the natural gas provided by the gas supplier with high natural gas energy per unit time is allocated to the gas consumption area with high gas energy, and the natural gas with low natural gas energy per unit time is allocated to the gas consumption area with low gas energy, so as to solve the problem of insufficient natural gas supply during the peak time of gas consumption.

Suppose that the gas supplier of a natural gas company includes gas supplier A, gas supplier B and gas supplier C. The relationship between the natural gas energy provided by the gas supplier per unit time is: gas supplier A>gas supplier B>gas supplier C. The gas supply area includes area A, area B and area C. The size relationship of each area meets the following requirements: area A<area B<area C, and the gas peak time periods of area A, area B and area C are different. Generally, in order to meet the daily gas consumption of each region, region A uses the natural gas provided by gas supplier B, region B uses the natural gas provided by gas supplier A, and region C uses the natural gas provided by gas supplier C. When area C is in the peak time period of gas consumption, because the natural gas provided by gas supplier C produces less natural gas energy per unit time and cannot meet the natural gas energy of area C, the natural gas provided by gas supplier A or B may be transported to area C and the natural gas provided by gas supplier C may be transported to area A or B by calculating the gas energy of area C in the peak time periods of gas consumption. Since region A or region B is not at the peak of gas consumption at this time, it will not affect the use of natural gas in region A or region B, nor will it cause insufficient gas consumption in region C during the peak time period of gas consumption.

Further, in order to facilitate the user to understand the natural gas price used, in this embodiment, the management platform also includes a pricing module, which is used to convert the natural gas energy per unit time and the energy pricing scheme of the management platform into the corresponding transaction amount and transmit it to the user. The user can avoid the peak time of gas consumption according to the natural gas price.

Further, in this embodiment, an early warning module is also set. When the energy metering module fails, the early warning module is used to automatically select the historical data of the energy metering module in the corresponding time period and calculate the average value as the natural gas energy data during the failure of the energy metering module, which can not only ensure that the gas metering transaction is not interrupted, at the same time, it is more in line with the actual gas consumption of users. One cycle may be one week or one month, and the specific cycle may be selected according to the actual situation.

In some embodiments, a volume metering module and a conversion module are also provided.

The volume measurement module is used to calculate the volume of natural gas per unit time according to temperature, pressure, component, content, flow, compression factor and density.

The conversion module is used to realize the conversion of the energy metering module and the volume metering module.

In this embodiment, the volume metering module and the conversion module have two functions:

(1) When the component sensor of the sensing control platform fails, resulting in the lack of gas component data in the management platform and the failure of energy conversion, the management platform may start the volume pricing scheme, that is, change the energy pricing scheme to the volume pricing scheme to ensure the uninterrupted gas metering transaction.

(2) When the gas supplier uses the international trade measurement unit energy measurement transaction to the demander, the conversion to volume measurement display is realized through the conversion module, which not only saves the demander's equipment transformation cost, does not need to change the measurement habit, but also realizes the role of transaction supervision.

A method for measuring energy of natural gas in a full cycle, as shown in FIG. 7, process 700 includes the following steps:

S701: obtain natural gas information provided by multiple gas suppliers. Among them, the natural gas information includes temperature, pressure, component, content, flow, compression factor, density and calorific value.

It is also used to obtain the peak time period of gas consumption in the gas consumption area and the corresponding gas consumption energy.

S702: obtain the natural gas energy in multiple unit times according to the natural gas information, and transmit the corresponding natural gas to the gas consumption area according to the natural gas energy, the peak time period of gas consumption and the gas consumption energy.

Specifically, firstly, the natural gas energy per unit time is calculated according to the natural gas temperature, natural gas pressure, natural gas component, natural gas content, natural gas flow, natural gas compression factor, natural gas density and natural gas calorific value provided by each gas supplier. Until the natural gas energy per unit time of natural gas provided by each gas supplier is calculated.

Secondly, match the corresponding natural gas energy according to the gas consumption energy of different gas consumption areas, and transmit the natural gas provided by the corresponding gas supplier to the gas consumption areas during the peak time of gas consumption.

The basic concepts have been described above, apparently, in detail, as will be described above, and does not constitute a limitations of the present disclosure. Although there is no clear explanation here, those skilled in the art may make various modifications, improvements, and corrections for the present disclosure. This type of modification, improvement, and corrections are recommended in the present disclosure, so this class is corrected, improved, and the amendment remains in the spirit and scope of the exemplary embodiment of the present disclosure.

Meanwhile, the present disclosure uses specific words to describe embodiments of the present specification. As "one embodiment", "an embodiment", and/or "some embodiments" means a certain feature, structure, or characteristic of the present disclosure at least one embodiment. Therefore, it is emphasized and should be appreciated that two or more references to "an embodiment" or "one embodiment" or "an alternative embodiment" in various parts of this disclosure are not necessarily all referring to the same embodiment. Further, certain features, structures, or features of one or more embodiments of the present disclosure can be combined.

Moreover, unless the claims are clearly stated, the sequence of the present disclosure, the use of the digital letters, or the use of other names, is not used to define the order of the present specification processes and methods. Although some embodiments of the invention currently considered useful have been discussed through various examples in the above disclosure, it should be understood that such details are only for the purpose of illustration, and the additional claims are not limited to the disclosed embodiments. On the contrary, the claims are intended to cover all amendments and equivalent combinations in line with the essence and scope of the embodiments of the specification. For example, although the implementation of various components described above may be embodied in a hardware device, it may also be implemented as a software only solution, e.g., an installation on an existing server or mobile device.

Similarly, it should be noted that in order to simplify the expression disclosed in the present disclosure and help the understanding of one or more invention embodiments, in the previous description of the embodiments of the present disclosure, a variety of features are sometimes combined into one embodiment, drawings or description thereof. However, the present disclosure method does not mean that the features needed in the spectrum ratio of this disclosure ratio are more characteristic. Rather, claimed subject matter may lie in less than all features of a single foregoing disclosed embodiment.

In some embodiments, a number of descriptive components, attributes, should be understood, such for the numbers described in the embodiments, in some examples, used corrected words Unless otherwise stated, "about," "approximate," or "substantially" may indicate ±20% variation of the value it describes. Accordingly, in some embodiments, the numerical parameters used in the present disclosure are approximate values, and the approximate values may be changed according to characteristics required by individual embodiments. In some embodiments, the numerical parameters should consider the prescribed effective digits and adopt a general digit retention method. Although the numerical domains and parameters used in the present disclosure are used to confirm its range breadth, in the specific embodiment, the settings of such values are as accurate as possible within the feasible range.

For each patent, patent application, patent application publication and other materials referenced by the present disclosure, such as articles, books, instructions, publications, documentation, etc., hereby incorporated herein by reference. Except for the application history documentation of the present specification or conflict, there is also an except for documents (currently or after the present disclosure) in the most wide range of documents (currently or later). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described in the present disclosure are intended to illustrate the principles of the embodiments of the present disclosure. Other deformations may also belong to the scope of this disclosure. Thus, as an example, not limited, the alternative configuration of the present disclosure embodiment can be consistent with the teachings of the present disclosure. Accordingly, the embodiments of the present disclosure are not limited to the embodiments of the present disclosure clearly described and described.

We claim:

1. A method for intelligent metering of natural gas, implemented on a computing device including a storage device and at least one processor, the method comprising:

obtaining a metering value of the natural gas used by a user in a time period from a metering device via a network, the metering device being located at a gas supply terminal of a transmission pipe network;

determining a consumption amount of the natural gas based on the metering value and a pricing scheme, wherein the pricing scheme includes a volume-based pricing scheme and an energy-based pricing scheme, a unit of the metering value is a volume unit and the volume-based pricing scheme includes a volume unit price of the natural gas in one volume unit, in the pricing scheme, volume units of the natural gas in different component types are the same, and volume unit prices of the natural gas in different component types are different, the volume unit prices of the natural gas in different component types are determined based on an adjustment model, the adjustment model being a deep neural network (DNN) model;

the adjustment model is configured to determine adjusted energy per unit volume of the natural gas by processing energy per unit volume before adjustment and detection data of the natural gas, wherein the energy per unit volume before adjustment refers to an energy value released by combustion of per unit volume of natural gas output by a gas supplier, the detection data includes a temperature, a pressure, a component, a content, a flow, a compression factor, a density, and a calorific value of the natural gas output by the natural gas supplier; and the volume unit prices of the natural gas are determined based on the adjusted energy per unit volume, wherein the adjusted energy per unit volume refers to an energy value generated by the combustion of natural gas per unit volume during an actual use of the user.

2. The method of claim 1, wherein in the pricing scheme, volume units of the natural gas in different component types are different, and volume unit prices of the natural gas in different component types are the same.

3. The method of claim 2, wherein the obtaining a metering value of the natural gas used by a user in a time period comprises:

collecting an initial metering value of the natural gas used by a user in a time period based on the metering device;

obtaining the metering value of the natural gas based on correction of the initial metering value by a correction model, the correction model being a DNN model.

4. The method of claim 3, wherein a first correction model, a second correction model and an energy difference model are obtained through joint training based on training samples, the trained first correction model or the trained second correction model is used as the correction model, and the joint training includes:

inputting initial values of two kinds of natural gas to the first correction model and the second correction, respectively;

inputting an output of the first correction model and the second correction model to the energy difference model;

constructing a loss function based on an output and a label of the energy difference model; and obtaining the trained first correction model or the trained second correction model by iteratively updating the first correction model or second correction model based on the loss function.

5. The method of claim 1, wherein a unit of the metering value is an energy unit, and the energy-based pricing scheme includes an energy unit price of the natural gas in one energy unit.

6. The method of claim 5, wherein the obtaining a metering value of the natural gas used by a user in a time period comprises:

determining the metering value of the natural gas used by the user in the time period based on a detection parameter obtained by a natural gas energy metering terminal, wherein the natural gas energy metering terminal is integrated by a variety of sensors; and the detection parameter includes at least one of a temperature, a pressure, a composition, a content, a flow, a compression factor, a density, and a calorific value.

7. A system for intelligent metering of natural gas, comprising:

at least one storage device including a set of instructions; and at least one processor in communication with the at least one storage device, wherein when executing the set of instructions, the at least one processor is configured to cause the system to perform an operation comprising:

obtaining a metering value of the natural gas used by a user in a time period from a metering device via a network, the metering device being located at a gas supply terminal of a transmission pipe network;

determining a consumption amount of natural gas based on the metering value and a pricing scheme, wherein the pricing scheme includes a volume-based pricing scheme and an energy-based pricing scheme, a unit of the metering value is a volume unit and the volume-based pricing scheme includes a volume unit price of the natural gas in one volume unit, in the pricing scheme, volume units of the natural gas in different component types are the same, and volume unit prices of the natural gas in different component types are different, the volume unit prices of the natural gas in different component types are determined based on an adjustment model, the adjustment model being a deep neural network (DNN) model;

the adjustment model is configured to determine adjusted energy per unit volume of the natural gas by processing energy per unit volume before adjustment and detection data of the natural gas, wherein the energy per unit volume before adjustment refers to an energy value released by combustion of per unit volume of natural gas output by a gas supplier, the detection data includes a temperature, a pressure, a component, a content, a flow, a compression factor, a density, and a calorific value of the natural gas output by the natural gas supplier; and the volume unit prices of the natural gas are determined based on the adjusted energy per unit volume, wherein the adjusted energy per unit volume refers to an energy value generated by the combustion of natural gas per unit volume during an actual use of the user.

8. The system of claim 7, wherein in the pricing scheme, volume units of the natural gas in different component types are different, and volume unit prices of the natural gas in different component types are the same.

9. The system of claim 8, wherein to obtain a metering value of the natural gas used by a user in a time period, the at least one processor is configured to cause the system to perform at least one operation comprising:

collecting an initial metering value of the natural gas used by a user in a time period based on the metering device;

obtaining the metering value of the natural gas based on correction of the initial metering value by a correction model, the correction model being a DNN model.

10. The system of claim 9, wherein a first correction model, a second correction model and an energy difference model are obtained through joint training based on training samples, the trained first correction model or the trained second correction model is used as the correction model, and the joint training includes:

inputting initial values of two kinds of natural gas to the first correction model and the second correction, respectively;

inputting an output of the first correction model and the second correction model to the energy difference model;

constructing a loss function based on an output and a label of the energy difference model; and obtaining the trained first correction model or the trained second correction model by iteratively updating the first correction model or second correction model based on the loss function.

11. The system of claim 7, wherein a unit of the metering value is an energy unit, and the energy-based pricing scheme includes an energy unit price of the natural gas in one energy unit.

12. The system of claim 11, wherein to obtain a metering value of the natural gas used by a user in a time period, the at least one processor is configured to cause the system to perform at least one operation comprising:

determining the metering value of the natural gas used by the user in the time period based on a detection parameter obtained by a natural gas energy metering terminal, wherein the natural gas energy metering terminal is integrated by a variety of sensors; and the detection parameter includes at least one of a temperature, a pressure, a composition, a content, a flow, a compression factor, a density, and a calorific value.

13. A non-transitory computer readable medium storing instructions, when executed by at least one processor, causing the at least one processor to implement a method comprising:

obtaining a metering value of the natural gas used by a user in a time period from a metering device via a network, the metering device being located at a gas supply terminal of a transmission pipe network; and determining a consumption amount of natural gas based on the metering value and a pricing scheme, wherein the pricing scheme includes a volume-based pricing scheme and an energy-based pricing scheme, a unit of the metering value is a volume unit and the volume-based pricing scheme includes a volume unit price of the natural gas in one volume unit, in the pricing scheme, volume units of the natural gas in different component types are the same, and volume unit prices of the natural gas in different component types are different, the volume unit prices of the natural gas in different component types are determined based on an adjustment model, the adjustment model being a deep neural network (DNN) model;

the adjustment model is configured to determine adjusted energy per unit volume of the natural gas by processing energy per unit volume before adjustment and detection data of the natural gas, wherein the energy per unit volume before adjustment refers to an energy value released by combustion of per unit volume of natural gas output by a gas supplier, the detection data includes a temperature, a pressure, a component, a content, a flow, a compression factor, a density, and a calorific value of the natural gas output by the natural gas supplier; and the volume unit prices of the natural gas are determined based on the adjusted energy per unit volume, wherein the adjusted energy per unit volume refers to an energy value generated by the combustion of natural gas per unit volume during an actual use of the user.

* * * * *